United States Patent [19]

Southard

[11] 3,871,482

[45] Mar. 18, 1975

[54] TREE STAND

[76] Inventor: Benny S. Southard, Rt. 1, Box 711, Summerfield, N.C. 27358

[22] Filed: June 26, 1973

[21] Appl. No.: 373,689

[52] U.S. Cl. ............................................. 182/187
[51] Int. Cl. ............................................ A47c 9/10
[58] Field of Search ................................. 182/187

[56] References Cited
UNITED STATES PATENTS

| | | | |
|---|---|---|---|
| 3,419,108 | 12/1968 | Mobbs | 182/187 |
| 3,460,649 | 8/1969 | Baker | 182/187 |
| 3,493,080 | 2/1970 | Ehlert | 182/187 |
| 3,513,940 | 5/1970 | Ussery | 182/187 |

Primary Examiner—Reinaldo P. Machado

[57] ABSTRACT

A portable tree stand includes a base support having a rigid platform secured thereto, a foldable seat pivotably attached to the base support and platform, and a flexible locking member adapted to be looped around a tree and attached to the foldable seat. When erected for use, the support base abuts the side of a tree, and the foldable seat and flexible member are positioned above the platform. The stand folds flat and is provided with a strap for carrying on a hunter's back.

9 Claims, 4 Drawing Figures

PATENTED MAR 18 1975  3,871,482

TREE STAND

BRIEF SUMMARY AND OBJECTS OF THE INVENTION

This invention relates generally to tree or pole supported platforms and more particularly to a lightweight, portable platform and seat assembly for carrying on a person's back and for releasable attachment to a tree.

Briefly, the invention comprises a base including a rigid platform secured to angle members, a seat mounted upon the base and a chain adapted to encompass a tree or other vertical support and have the ends attached to the seat.

The seat is of the foldable type supported by legs collapsible into a generally flattened condition adjacent the platform and angle members for carrying from location to location.

When mounted upon a tree, the platform extends a substantial distance forwardly of the seat and is designed to allow full mobility. The seat can be folded readily by pushing with the back of the leg enabling a hunter to arise and fold the seat without unnecessary motions. With the seat folded, substantially the entire platform can be used for standing room, thus providing a full 360° firing field.

The chain encompasses a tree or pole and is attached to the seat main support bars such that when the stand is in position, the weight of the stand produces a lever action tightly locking the stand to the tree. The weight of a person upon the stand tends to lock it tighter. The stand does not incorporate spikes, blades, etc., for cutting or biting into the tree for proper support. The base angle members press against the tree without cutting or otherwise damaging the tree. To remove the stand from the tree, it is merely raised vertically and the chain unlocked.

One of the primary objects of the invention is the provision of a new and improved portable tree stand upon which a person may stand or be seated.

Another object of the invention is the provision of a lightweight, stable tree stand of simple construction which can be quickly and securely fastened to a tree or collapsed into a compact unit for carrying from place to place on a hunter's back.

Still another object of the invention is the provision of a collapsible tree stand having a foldable seat which incorporates substantial advantages and improvements over known stands.

Other objects and advantages of the invention will become apparent when considered in view of the following detailed description.

DETAILED DESCRIPTION OF THE INVENTION

Figure 1:
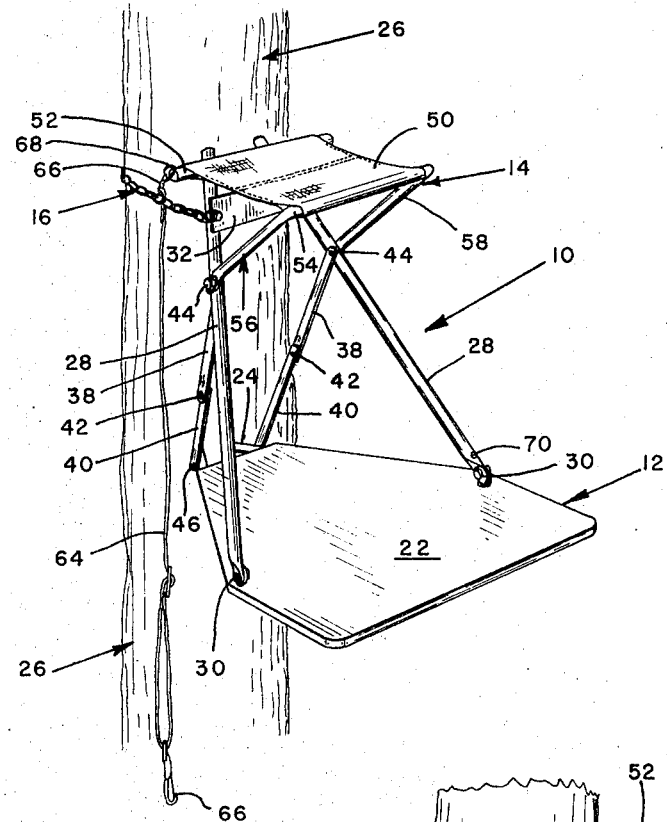
FIG. 1 is a perspective view of a preferred embodiment of the tree stand of the present invention locked upon a tree and with the foldable seat in position for use.

Referring to the drawing, the tree stand 10 basically consists of a base support assembly 12, a seat assembly 14, and a flexible member 16 adapted to be looped or wrapped around a pole, tree or other vertical support.

Figure 2:
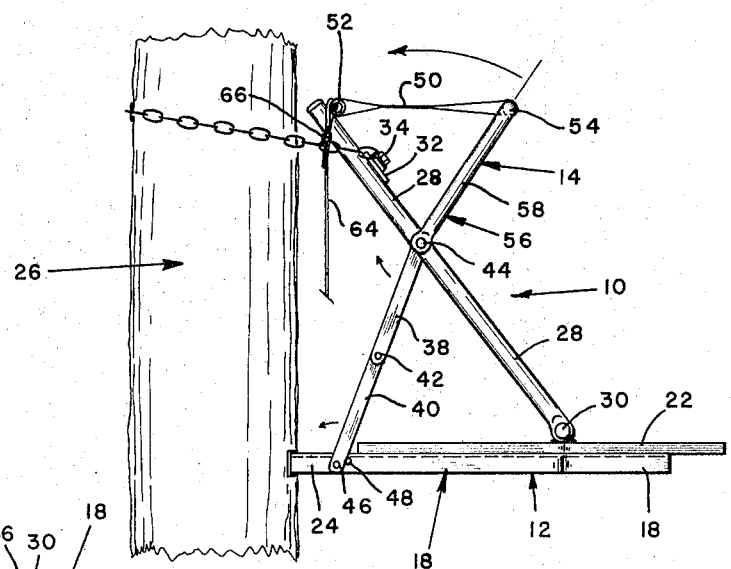
FIG. 2 is a side elevational view of the portable tree stand of FIG. 1 and with the arrows indicating the directions of pivotable movement of various components when collapsing the tree stand.
Figure 3:
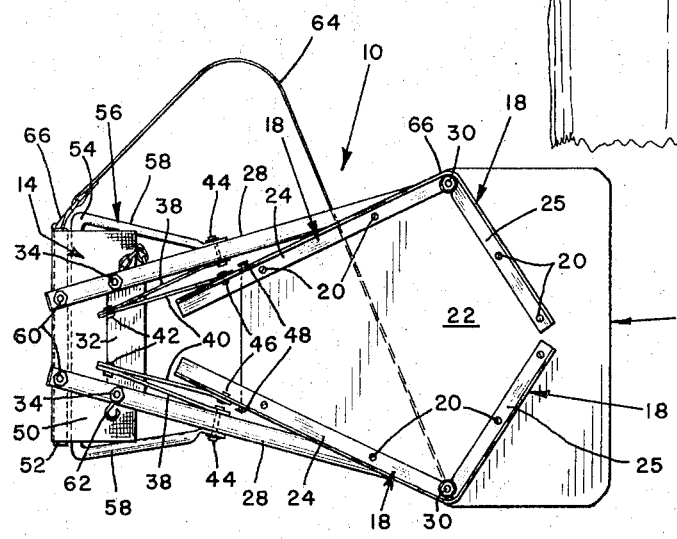
FIG. 3 is a bottom plan view of the tree stand in the collapsed condition and with the seat folded.

Referring specifically to the base support assembly 12, rigid angle members 18 are attached by fasteners 20 to the underneath side of a rigid platform 22. The angle members 18, consisting of sections 24 and 25, serve to reinforce the platform 22. The platform may be formed of various relatively rigid materials and preferably is of plywood construction. The platform 22 is generally triangular shaped with a relatively narrow section located closest to a tree, when erected, and a wider section positioned forwardly of the seat assembly 14 to provide maximum room and mobility for a hunter upon the stand. A section 24 of each angle member 18 extends along an edge of the platform 22 and, as shown by FIGS. 1–3, extends beyond the platform for abutting a tree 26 at two locations. The ends of the angle member sections 24 merely abut and do not cut or damage the tree. Alternatively, means, such as an arcuate member, not shown, could be provided at the ends of the sections 24 for abutting the tree.

Figure 4:
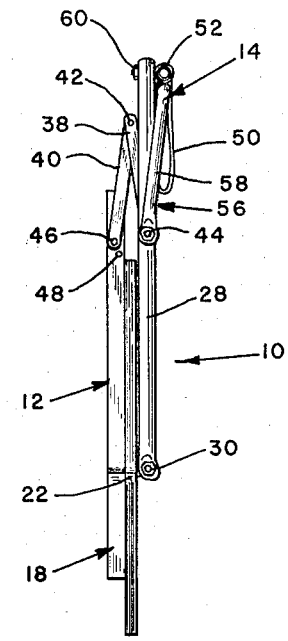
FIG. 4 is a side elevational view of the stand in a collapsed condition.

The seat assembly 14 is supported upon the base support assembly 12 and is adapted to fold substantially flat against the platform 22, as shown by FIGS. 3 and 4. The assembly 14 includes a pair of rigid leg members or brace bars 28 pivotably mounted upon the base support assembly 12, each bar 28 being mounted by a suitable fastener 30 which is provided adjacent the juncture of sections 24, 25 of an angle member 18. The upper end portions of the bars 28, 28 are inclined inwardly, as shown by FIGS. 1 and 3, and are fixed relatively to each other by rigid bar 32 and fasteners 34.

Pivotably attached to the brace arms 28, by fasteners 36, are pairs of folding bars 38, 40. The folding bars 38, 40 are pivoted to each other by pins 42 while the uppermost ends of bars 38 are pivotally attached to the leg members 28 by fasteners 44 and the lowermost ends of bars 40 are pivotally attached by fasteners 46 to the sections 24 of angle members 18. The folding bars 38, 40 may be pivoted from the collapsed positions of FIGS. 3 and 4 to the erected positions of FIGS. 1 and 2. Stop members 48, FIG. 2, are fastened to the angle members 18 forwardly of the pivotable fasteners 46. Upon folding of the bars 38, 40 from the collapsed position to a few degrees past center, the bars 40 abut stop members 48 limiting further pivoting of the bars 38, 40.

A flexible seat 50, which may be of canvas or other heavy duty material, is seamed to form loops around a rod 52 and a section 54 of generally U-shaped member 56. The legs 58 of the U-shaped member are pivotably secured to the brace bars 28 by the same fasteners 44 that secure the bars 38 to the brace bars 28. The rod 52 is attached by fasteners 60 to the ends of the brace bars 28 remote to the platform 22.

In the preferred embodiment, the flexible member 16 comprises a chain having one end secured by a fastener 34 adjacent the rigid bar 32. The opposite fastener 34 has a hook 62, FIG. 3, attached thereto over which a selected link of the chain is adapted to be attached. Therefore, the effective length of the chain 16 can be adjusted by hooking a selected link over the hook 62 after looping the chain about a tree. The fixed chain end and the hook 62 are so positioned upon the main braces 28 such that when a stand is positioned upon a tree a lever action tightly locks the stand in position.

A sling 64 may be provided for carrying the portable tree stand upon the back when folded to the collapsed condition of FIGS. 3 and 4. Preferably the strap is adjustable and has a hook 66 at each end for cooperating with openings 68, 70 on one of the main brace bars 28 and one end of the rod 52 such that the strap 64 extends diagonally across the chest. The stand folds flat and is quiet such that a hunter can hunt without discomfort or hindrance while carrying the stand on his back. The seat folds and makes the backrest when carrying. Also, the chain may be stored within the flexible seat 50 while the stand is being carried from place to place. The portable stand is light in weight, preferably being formed of aluminum, with the exception of the plywood platform, the chain and the flexible seat. Also, in the preferred embodiment, the platform and folding seat are generally 19 inches by 23 inches and 10 inches by 12 inches, respectively, in size.

I claim:

1. A portable, foldable tree stand upon which a hunter may stand or be seated comprising, a rigid base support means adapted to be positioned substantially horizontally in abutting relationship with the side of a tree, said base support means including a rigid platform, seat means pivotably mounted upon said base support means and located above said base support means when said tree stand is supported upon a tree and adapted to be collapsed against said base support means when transporting said tree stand, and elongated means adapted to be looped around said tree and adjustably secured to said seat means for supporting said tree stand upon said tree, said seat means including a pair of spaced rigid brace means and a pair of articulated brace means, said rigid and said articulated brace means being interconnected and pivotably mounted and securely fastened upon and cooperatively displaceable relative to said rigid base support means and a seat member foldable relative to said brace means and said rigid base means from a position supporting a seated hunter to a position for exposing substantially the entire rigid platform and supporting a hunter in a standing position.

2. A portable tree stand as recited in claim 1, wherein said seat brace means includes rigid leg members pivotably connected to said base support means and pairs of pivotably interconnected links interconnecting said rigid leg members and said base support means, and means locking said pairs of links in over center positions when erected upon said base supporting means.

3. A portable tree stand as recited in claim 2, wherein said base support means includes members reinforcing said platform, said rigid leg members being pivotably mounted upon said platform.

4. A portable tree stand as recited in claim 1, said seat means further including a generally U-shaped member pivotably mounted upon said brace means and supporting one end of said foldable seat, the other end of said seat being supported by a cross bar mounted upon said brace means.

5. A portable tree stand as recited in claim 4, said seat being foldable for exposing the entire platform upon pivotable displacement of said U-shaped member.

6. A portable tree stand as recited in claim 2, wherein said flexible means comprises a chain secured to said brace means.

7. A portable tree stand as recited in claim 6, wherein one end of said chain is secured to one of said rigid leg members and the other end of said chain is releasably, adjustably attached to a fastener mounted upon another one of said rigid leg members.

8. A portable tree stand as recited in claim 1, and further including a strap for transporting the tree stand when in a folded, collapsed condition.

9. A portable tree stand as recited in claim 1, wherein said elongated means comprises a flexible member secured to said brace means and adapted to be looped around a tree and located a substantial distance vertically above said base support means such that said base support means abut the tree.

* * * * *